(12) United States Patent  (10) Patent No.: US 9,015,061 B2
Ueda  (45) Date of Patent: Apr. 21, 2015

(54) PASSENGER GUIDANCE DISPLAY SYSTEM, PASSENGER GUIDANCE DISPLAY APPARATUS, AND PASSENGER GUIDANCE DISPLAY METHOD

(75) Inventor: Naoki Ueda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 109 days.

(21) Appl. No.: 13/806,586

(22) PCT Filed: Aug. 6, 2010

(86) PCT No.: PCT/JP2010/063394
§ 371 (c)(1),
(2), (4) Date: Dec. 21, 2012

(87) PCT Pub. No.: WO2012/017550
PCT Pub. Date: Feb. 9, 2012

(65) Prior Publication Data
US 2013/0097025 A1 Apr. 18, 2013

(51) Int. Cl.
G06Q 30/00 (2012.01)
G06Q 30/02 (2012.01)
G06Q 50/30 (2012.01)

(52) U.S. Cl.
CPC ........ *G06Q 30/0266* (2013.01); *G06Q 30/0241* (2013.01); *G06Q 30/0281* (2013.01); *G06Q 50/30* (2013.01)

(58) Field of Classification Search
USPC ........ 246/122 R, 108; 705/14.63, 27; 725/32, 725/34
See application file for complete search history.

(56) References Cited

U.S. PATENT DOCUMENTS 4,307,859 A 12/1981 Hayashi et al.
2002/0057212 A1 5/2002 Hamilton et al.
(Continued)

FOREIGN PATENT DOCUMENTS

JP 10-069248 A 3/1998
JP 2002-304574 A 10/2002
(Continued)

OTHER PUBLICATIONS

"Method and Apparatus for Providing Broadcast Information Services in a Public Transportation System". IBM. Jan. 8, 2010. pp. 1-6.*

(Continued)

*Primary Examiner* — Victoria Vanderhorst
*Assistant Examiner* — Victoria Frunzi
(74) *Attorney, Agent, or Firm* — Buchanan Ingersoll & Rooney PC

(57) ABSTRACT

The present invention provides a passenger guidance display system comprising a service managing apparatus configured to manage on-rail information and a service schedule of a train and a passenger guidance display apparatus provided in a station premise and configured to perform display of passenger guidance using service information of a train scheduled to arrive next transmitted from the service managing apparatus. The passenger guidance display apparatus includes an advertisement database including advertisement data associated with service information of trains, a display control unit configured to select, from the advertisement database, advertisement data associated with the service information of the train scheduled to arrive transmitted from the service managing apparatus and combine the selected advertisement data and the service information to create, as one screen, a guidance video including advertisement guidance, and a display device configured to display the guidance video according to control by the display control unit.

13 Claims, 7 Drawing Sheets

(56) References Cited

U.S. PATENT DOCUMENTS

| | | | |
|---|---|---|---|
| 2002/0069017 A1 | 6/2002 | Schmier et al. | |
| 2003/0046687 A1* | 3/2003 | Hodges et al. | 725/32 |
| 2004/0181466 A1* | 9/2004 | Ishida et al. | 705/27 |
| 2007/0150129 A1* | 6/2007 | Davenport et al. | 701/19 |
| 2008/0046921 A1* | 2/2008 | Fujimaki | 725/34 |
| 2012/0001029 A1* | 1/2012 | Kondo et al. | 246/108 |

FOREIGN PATENT DOCUMENTS

| | | | | |
|---|---|---|---|---|
| JP | 3089328 U | | 10/2002 | |
| JP | 2008-155765 A | | 7/2008 | |
| JP | 2008155765 A | * | 7/2008 | |
| JP | 2009-015239 A | | 1/2009 | |
| JP | 2009-067252 A | | 4/2009 | |
| JP | 2009067252 A | * | 4/2009 | |
| JP | 2010-058634 A | | 3/2010 | |
| JP | 2010058634 A | * | 3/2010 | |
| WO | 01/57763 A1 | | 8/2001 | |
| WO | WO 2006/051971 A1 | | 5/2006 | |

OTHER PUBLICATIONS

Singapore Search and Examination Report dated Oct. 21, 2013, issued in corresponding Singapore Patent Application No. 201300378-5. (13 pgs).

International Search Report (PCT/ISA/210) issued on Aug. 31, 2010, by the Japanese Patent Office as the International Searching Authority for International Application No. PCT/JP2010/063394.

Written Opinion (PCT/ISA/237) issued on Aug. 31, 2010, by the Japanese Patent Office as the International Searching Authority for International Application No. PCT/JP2010/063394.

European Search Report dated Nov. 11, 2014 issued in corresponding European Patent Appln. No. 10855640.8 (7 pages).

* cited by examiner

FIG.2

| RAPID | ADVERTISEMENT C1 |
| --- | --- |
| | ADVERTISEMENT C2 |
| LOCAL | ADVERTISEMENT C3 |
| | ADVERTISEMENT C4 |

(a)

| DESTINATION D1 | ADVERTISEMENT F1 |
| --- | --- |
| | ADVERTISEMENT F2 |
| DESTINATION D2 | ADVERTISEMENT F3 |
| | ADVERTISEMENT F4 |

(b)

| STOP S1 | ADVERTISEMENT G1 |
| --- | --- |
| | ADVERTISEMENT G2 |
| STOP S2 | ADVERTISEMENT G1 |
| | ADVERTISEMENT G2 |
| STOP S3 | ADVERTISEMENT G3 |
| | ADVERTISEMENT G4 |

(c)

| RAPID | |
| --- | --- |
| COMMON | ADVERTISEMENT C1 |
| | ADVERTISEMENT C2 |
| STOP S1 | ADVERTISEMENT G1 |
| | ADVERTISEMENT G2 |
| STOP S2 | ADVERTISEMENT G1 |
| | ADVERTISEMENT G2 |
| STOP S3 (DESTINATION) | ADVERTISEMENT F1 |

(d)

| RAPID | | | |
| --- | --- | --- | --- |
| COMMON | ADVERTISEMENT C1_S | ADVERTISEMENT C1_M | ADVERTISEMENT C1_L |
| | ADVERTISEMENT C2_S | ADVERTISEMENT C2_M | ADVERTISEMENT C2_L |
| STOP S1 | ADVERTISEMENT G1_S | ADVERTISEMENT G1_M | ADVERTISEMENT G1_L |
| | ADVERTISEMENT G2_S | ADVERTISEMENT G2_M | ADVERTISEMENT G2_L |
| STOP S2 | ADVERTISEMENT G1_S | ADVERTISEMENT G1_M | ADVERTISEMENT G1_L |
| | ADVERTISEMENT G2_S | ADVERTISEMENT G2_M | ADVERTISEMENT G2_L |
| STOP S3 (DESTINATION) | ADVERTISEMENT F1_S | ADVERTISEMENT F1_M | ADVERTISEMENT F1_L |

(e)

FIG.5
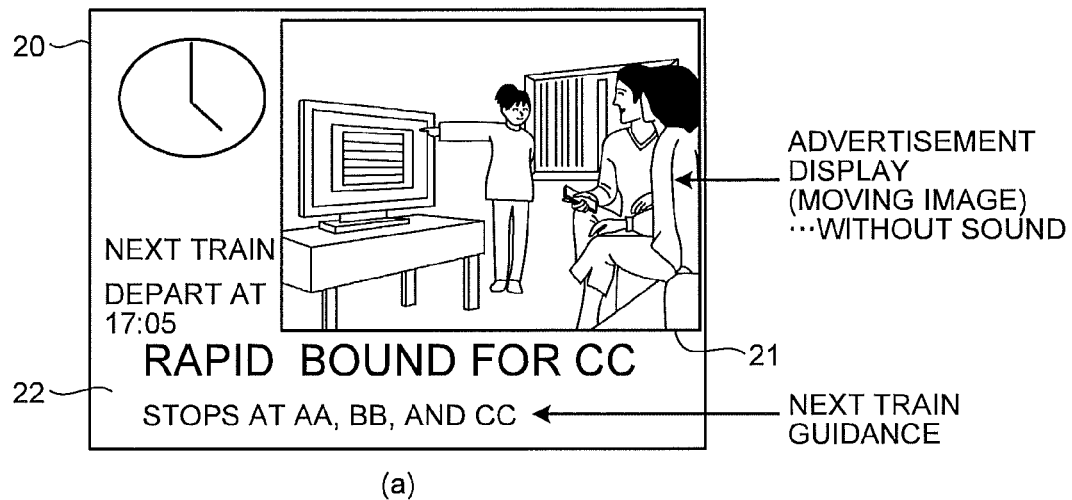
(a)
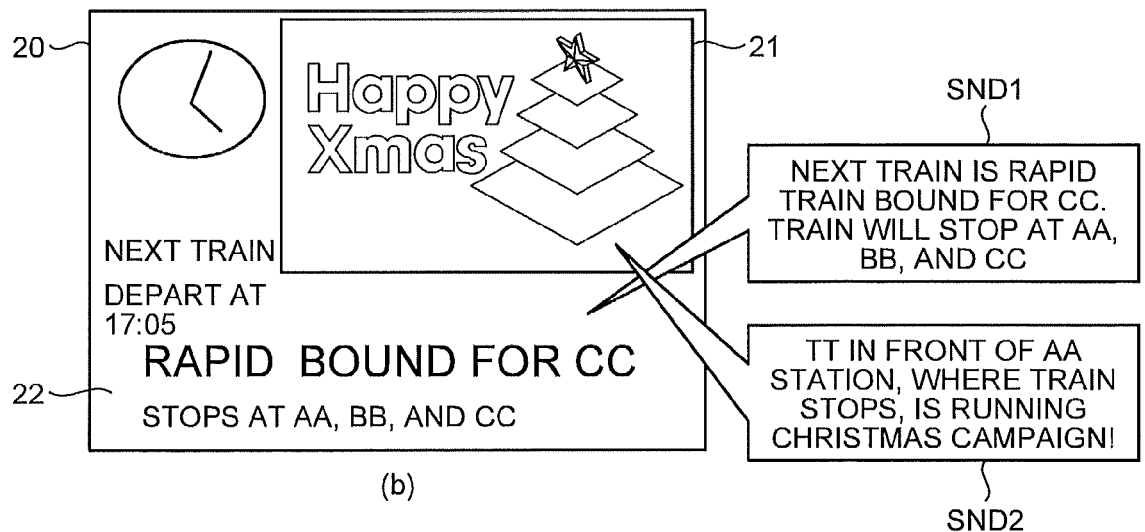
(b)
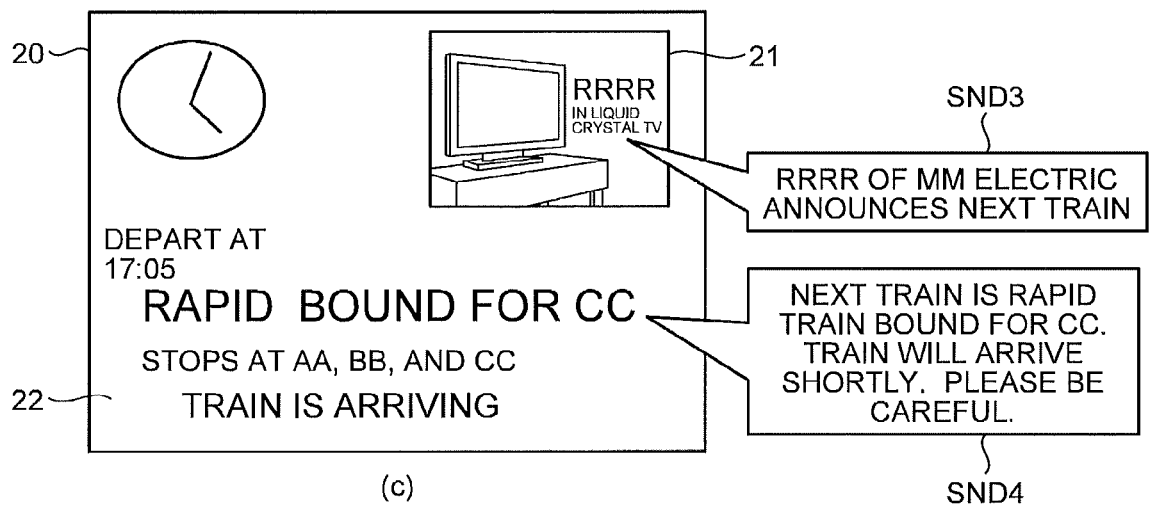
(c)

FIG.7
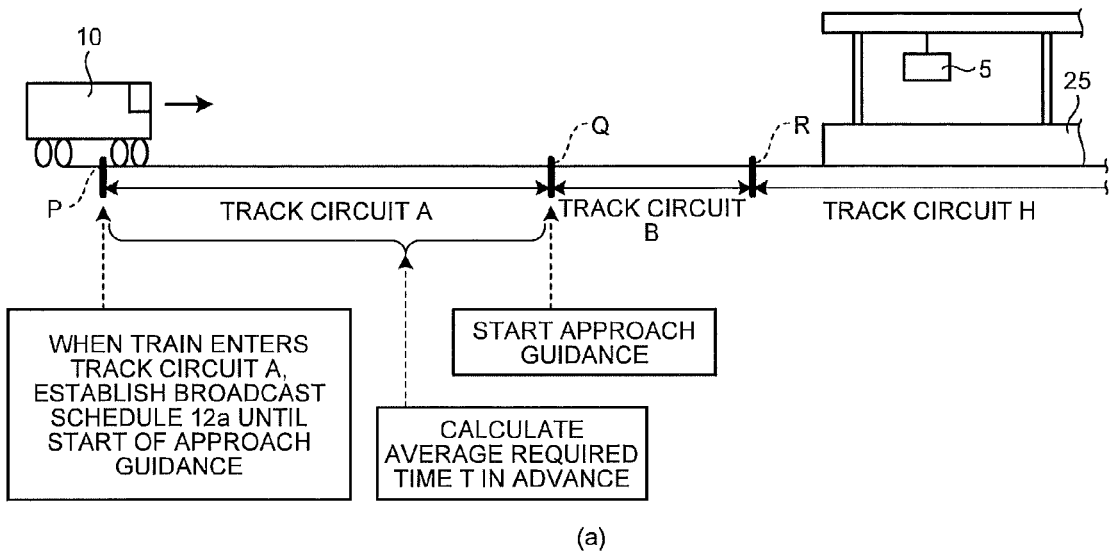
(a)
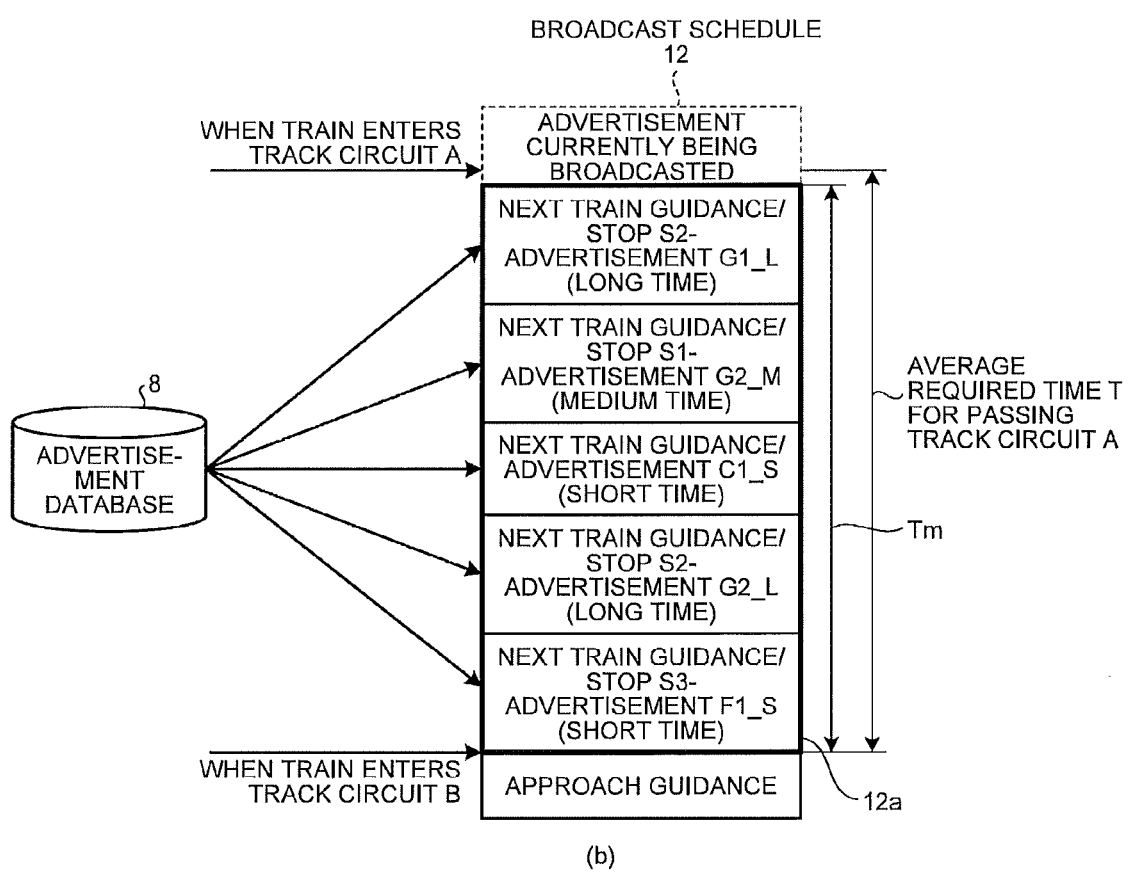
(b)

PASSENGER GUIDANCE DISPLAY SYSTEM, PASSENGER GUIDANCE DISPLAY APPARATUS, AND PASSENGER GUIDANCE DISPLAY METHOD

FIELD

The present invention relates to a passenger guidance display system, a passenger guidance display apparatus, and a passenger guidance display method for displaying passenger guidance such as service information of trains and advertisements.

BACKGROUND

In the past, a railway company sets, in a station premise, a passenger guidance display apparatus for displaying service information such as destinations, types, and departure times of trains and provides passengers with passenger guidance through the passenger guidance display apparatus. In the passenger guidance display apparatus, character display by subtitles, LEDs, or the like is used in the past. However, recently, a passenger guidance display apparatus that makes use of a liquid crystal display device is generally used according to the spread of a large liquid crystal display. The passenger guidance display apparatus can cooperate with electronic advertisements (digital signage).

Patent Literature 1 discloses a system in which a display device such as a large vision is provided in a community space in a station premise or the like to display, based on display control from a control center, advertisement information and the like related to a local trading area using the display device.

CITATION LIST

Patent Literature

Patent Literature 1: Japanese Patent Application Laid-open No. 2002-304574

SUMMARY

Technical Problem

However, in the system in the past described in Patent Literature 1, although the display device repeatedly displays, based on the display control from the control center, advertisement contents provided from advertisers in rotation for several companies, the display device continues to broadcast advertisements irrespective of a service status of trains. Therefore, there is a problem in that a degree of attention of passengers to the advertisements is low and an advertisement effect is deteriorated.

The present invention has been devised in view of the problems and it is an object of the present invention to provide a passenger guidance display system, a passenger guidance display apparatus, and a passenger guidance display method that can improve a degree of attention of passengers to advertisements and improve an advertisement effect.

Solution to Problem

In order to solve above-mentioned problems and achieve the object of the present invention, there is provided a passenger guidance display system including, a group of track circuits laid along a track of the train, including a first track circuit including a platform section of a station, a second track circuit being one track circuit before the first track circuit in a traveling direction of the train, and a third track circuit being one track circuit before the second track circuit in the traveling direction of the train, each of track circuits outputting track circuit information indicating a presence or an absence of on-rail of the train; an interlocking apparatus configured to collect the track circuit information output from the group of track circuits and output an on-rail position of the train detected based on the track circuit information as on-rail information; a service managing apparatus configured to specify and manage service information of the train based on the on-rail information output from the interlocking apparatus and a service schedule of the train, and generate, upon determining that the train enters the second track circuit based on the on-rail information, approach information for informing an approach of the train to the station; and a passenger guidance display apparatus provided in the station premise and configured to perform display of passenger guidance using the service information or the approach information of the train scheduled to arrive next transmitted from the service managing apparatus, wherein the passenger guidance display apparatus includes: an advertisement database including advertisement data associated with service information of trains; a display control unit configured to select, from the advertisement database, advertisement data associated with the service information of the train scheduled to arrive next and combine the selected advertisement data and the service information to create a singularity of or a plurality of first guidance videos and to perform a passenger guidance using the first guidance videos before receiving the approach information, and combine, after the first guidance videos guided during a reception of the approach information are finished, the selected advertisement data and the service information to create second guidance videos and to perform the passenger guidance using the second guidance videos after receiving the approach information; and a display device configured to display the first guidance videos or the second guidance videos according to control by the display control unit, wherein the service managing apparatus includes information concerning an average required time necessary for the train to pass the third track circuit and transmits, upon determining based on the on-rail information that the train enters the third track circuit, the information concerning the average required time to the passenger guidance display apparatus, and the display control unit calculates, upon a reception of the information concerning the average required time from the service managing apparatus, a broadcast adjustment time, which is a time obtained by subtracting from the average required time a remaining broadcast time of the first guidance videos broadcasted at the reception of the information concerning the average required time, and creates the first guidance videos such that a total broadcast time of the first guidance videos broadcasted on the display device after end of a broadcast of the first guidance videos and before start of a broadcast of the second guidance videos fits within the broadcast adjustment time.

A passenger guidance display apparatus according to the present invention, included in a passenger guidance display system comprising, a group of track circuits laid along a track of the train, including a first track circuit including a platform section of a station, a second track circuit being one track circuit before the first track circuit in a traveling direction of the train, and a third track circuit being one track circuit before the second track circuit in the traveling direction of the train, each of track circuits outputting track circuit information indicating a presence or an absence of on-rail of the train; an interlocking apparatus configured to collect the track circuit information output from the group of track circuits and output an on-rail position of the train detected based on the track circuit information as on-rail information; a service managing apparatus configured to specify and manage service information of the train based on the on-rail information output from the interlocking apparatus and the service schedule of the train, and generate, upon determining that the train enters the second track circuit based on the on-rail information, approach information for informing an approach of the train to the station, the passenger guidance display apparatus provided in the station premise and configured to perform display of passenger guidance using the service information or the approach information of the train scheduled to arrive next transmitted from the service managing apparatus, wherein the passenger guidance display apparatus includes: an advertisement database including advertisement data associated with service information of trains; a display control unit configured to select, from the advertisement database, advertisement data associated with the service information of the train scheduled to arrive next and combine the selected advertisement data and the service information to create a singularity of or a plurality of first guidance videos and to perform a passenger guidance using the first guidance videos before receiving the approach information, and combine, after the first guidance videos guided during a reception of the approach information are finished, the selected advertisement data and the service information to create second guidance videos and to perform the passenger guidance using the second guidance videos after receiving the approach information; and a display device configured to display the first guidance videos or the second guidance videos according to control by the display control unit, wherein the service managing apparatus includes information concerning an average required time necessary for the train to pass the third track circuit and transmits, upon determining based on the on-rail information that the train enters the third track circuit, the information concerning the average required time to the passenger guidance display apparatus, and the display control unit calculates, upon a reception of the information concerning the average required time from the service managing apparatus, a broadcast adjustment time, which is a time obtained by subtracting from the average required time a remaining broadcast time of the first guidance videos broadcasted at the reception of the information concerning the average required time, and creates the first guidance videos such that a total broadcast time of the first guidance videos broadcasted on the display device after end of a broadcast of the first guidance videos and before start of a broadcast of the second guidance videos fits within the broadcast adjustment time.

A passenger guidance display method employed in a passenger guidance display system comprising, a group of track circuits laid along a track of the train, including a first track circuit including a platform section of a station, a second track circuit being one track circuit before the first track circuit in a traveling direction of the train, and a third track circuit being one track circuit before the second track circuit in the traveling direction of the train, each of track circuits outputting track circuit information indicating a presence or an absence of on-rail of the train; an interlocking apparatus configured to collect the track circuit information output from the group of track circuits and output an on-rail position of the train detected based on the track circuit information as on-rail information; a service managing apparatus configured to specify and manage service information of the train based on the on-rail information output from the interlocking apparatus and a service schedule of the train, and generate, upon determining that the train enters the second track circuit based on the on-rail information, approach information for informing an approach of the train to the station; and a passenger guidance display apparatus provided in the station premise and configured to perform display of passenger guidance using the service information or the approach information of the train scheduled to arrive next transmitted from the service managing apparatus, wherein the passenger guidance display apparatus includes, an advertisement database including advertisement data associated with service information of trains; a display control unit configured to select, from the advertisement database, advertisement data associated with the service information of the train scheduled to arrive next and combine the selected advertisement data and the service information to create a singularity of or a plurality of first guidance videos and to perform a passenger guidance using the first guidance videos before receiving the approach information, and combine, after the first guidance videos guided during a reception of the approach information are finished, the selected advertisement data and the service information to create second guidance videos and to perform the passenger guidance using the second guidance videos after receiving the approach information; and a display device configured to display the first guidance videos or the second guidance videos according to control by the display control unit, wherein the passenger guidance display method includes a step of calculating, at the service managing apparatus, an average required time necessary for the train to pass the third track circuit by dividing a track length of the third track circuit by an average speed of the train in the third track circuit; a step of transmitting, at the service managing apparatus, upon determining based on the on-rail information that the train enters the third track circuit, information concerning the average required time to the passenger guidance display apparatus; a step of calculating, at the display control unit, upon a reception of the information concerning the average required time from the service managing apparatus, a broadcast adjustment time, which is a time obtained by subtracting from the average required time a remaining broadcast time of the first guidance videos broadcasted at the reception of the information concerning the average required time; and a step of creating, at the display control unit, the first guidance videos such that a total broadcast time of the first guidance videos broadcasted on the display device after end of a broadcast of the first guidance videos and before start of a broadcast of the second guidance videos fits within the broadcast adjustment time.

Advantageous Effects of Invention

According to the present invention, there is an effect that it is possible to improve a degree of attention of passengers to advertisements and improve an advertisement effect.

BRIEF DESCRIPTION OF DRAWINGS

FIG. 2 is a diagram of examples of storage formats of advertisement data stored in an advertisement database 8.

FIG. 5 is a diagram of an example of contents of display by the passenger guidance display apparatus 5.

FIG. 7 is a diagram for explaining an adjusting method for a broadcast schedule in a third embodiment.

DESCRIPTION OF EMBODIMENTS

Embodiments of a passenger guidance display system, a passenger guidance display apparatus, and a passenger guidance display method according to the present invention are explained in detail based on the drawings. The present invention is not limited by the embodiments.

First Embodiment

Figure 1:
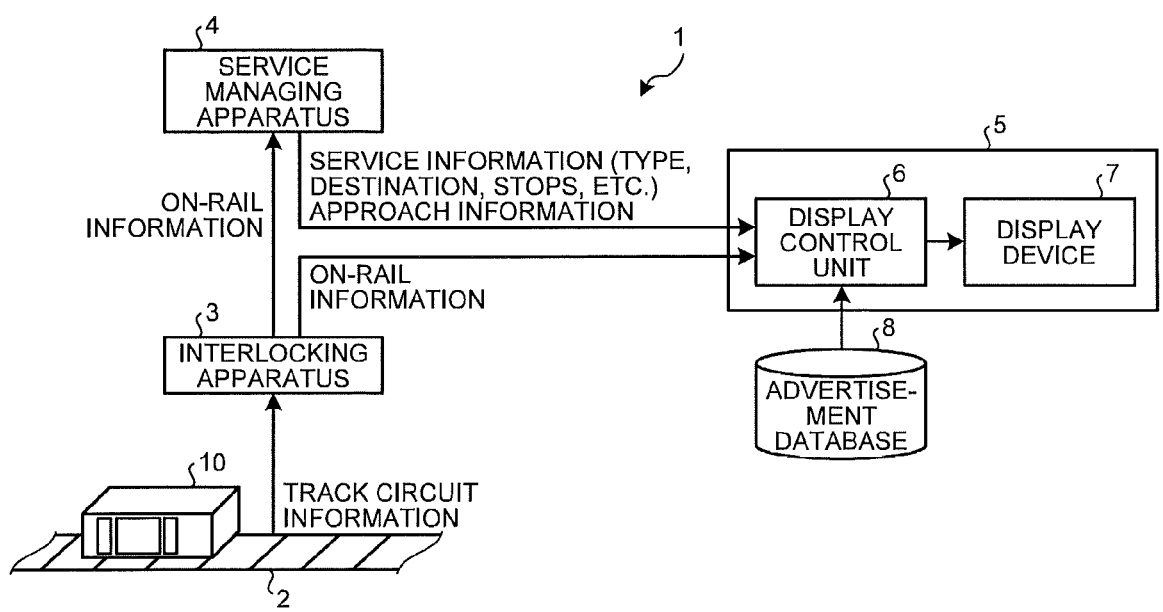
FIG. 1 is a diagram of a schematic configuration of a passenger guidance display system according to a first embodiment.

FIG. 1 is a diagram of a schematic configuration of a passenger guidance display system according to a first embodiment. As shown in FIG. 1, a passenger guidance display system 1 includes a track circuit 2, an interlocking apparatus 3, a service managing apparatus 4, a passenger guidance display apparatus 5, and an advertisement database 8.

The track circuit 2 is laid in each section along a track. The track circuit 2 outputs a signal for detecting presence or absence of on-rail of a train and detects an on-rail location of the train (e.g., a train 10) on a track. The signal output by the track circuit 2 is hereinafter referred to as track circuit information.

The interlocking apparatus 3 is connected to a plurality of track circuits 2 and collects track circuit information output by the track circuits 2. The interlocking apparatus 3 detects, based on the track circuit information, on-rail locations of trains on a track and outputs the on-rail locations as on-rail information. The interlocking apparatus 3 controls signals, railroad switches, and the like based on the track circuit information.

The service managing apparatus 4 mainly includes a computer set on the ground, has service schedule information, and performs service management for trains. The service managing apparatus 4 and the interlocking apparatus 3 are connected by a transmission line. The interlocking apparatus 3 transmits on-rail information to the service managing apparatus 4, for example, periodically.

The service managing apparatus 4 manages the on-rail information received from the interlocking apparatus 3 and service schedules and manages, based on the on-rail information and the service schedules, service information of trains departing from and arriving at platforms of stations. For example, upon detecting, according to the on-rail information, that a train is approaching a certain station, the service managing apparatus 4 specifies service information of the train (e.g., a type, a destination, and stops of the train) referring to a service schedule. The service managing apparatus 4 transmits the specified service information to the passenger guidance display apparatus 5 prior to the arrival of the train, for example, while the preceding train of the train stops in the station or immediately after the preceding train departs from the station. The type of the train refers to distinction of local, rapid, express, and the like.

The service managing apparatus 4 can perform tracking of a train for each track circuit and transmit, for example, approach information of the next train to the passenger guidance display apparatus 5 based on the on-rail information obtained from the interlocking apparatus 3. The approach information is transmitted from the service managing apparatus 4 as a signal for informing approach of a train when the train reaches a location a predetermined distance before a station, for example, when the train enters the immediately preceding track circuit in a traveling direction of the train with respect to a track circuit provided in the station. The service managing apparatus 4 and the passenger guidance display apparatus 5 are connected by a transmission line such as a LAN line.

The passenger guidance display apparatus 5 includes a display control unit 6 and a display device 7. The passenger guidance display apparatus 5 is connected to the advertisement database 8. The passenger guidance display apparatus 5 is set, for example, on a platform in a station premise. The display control unit 6 selects, based on service information transmitted from the service managing apparatus 4, advertisement data associated with the service information from the advertisement database 8. The display control unit 6 causes the display device 7 to display the selected advertisement data together with related service information according to a predetermined broadcast schedule. The display control unit 6 includes a CPU and a memory. The display device 7 includes, for example, a liquid crystal display. The advertisement database 8 can be provided in the passenger guidance display apparatus 5.

As explained above, the interlocking apparatus 3 transmits the on-rail information to the service managing apparatus 4. In this embodiment, the interlocking apparatus 3 is configured to be capable of directly transmitting the on-rail information to the passenger guidance display apparatus 5 as well (see FIG. 1). Specifically, the interlocking apparatus 3 and the passenger guidance display apparatus 5 are connected by a transmission line and the interlocking apparatus 3 transmits the on-rail information to the passenger guidance display apparatus 5 via the transmission line. With this configuration, even when a failure occurs in the service managing apparatus 4 and information cannot be acquired from the service managing apparatus 4 or even in a traveling location where information cannot be acquired from the service managing apparatus 4, the passenger guidance display apparatus 5 can directly acquire the on-rail information from the interlocking apparatus 3. The display control unit 6 can perform guidance using the on-rail information. It is also possible to adopt a configuration in which the interlocking apparatus 3 does not directly transmit the on-rail information to the passenger guidance display apparatus 5.

The advertisement database 8 has stored therein advertisement data associated with service information such as types, destinations, and stops of trains. The association (or linking) of the advertisement data can also be performed with respect to a plurality of items selected from the types, the destinations, the stops, and the like. For example, the advertisement data can be associated with the types and the stops.

FIG. 2 is a diagram of examples of storage formats of advertisement data stored in the advertisement database 8. In FIG. 2(a), advertisement data is associated with, for example, types (local and rapid). For example, "advertisement C1" and "advertisement C2" are associated with "rapid". The "advertisement C1" and the "advertisement C2" are respectively advertisement data. In FIG. 2(b), advertisement data is associated with, for example, "destination". For example, "advertisement F1" and "advertisement F2" are associated with "destination D1". In FIG. 2(c), advertisement data is associated with, for example, "stop". For example, "advertisement G1" and "advertisement G2" are associated with "stop S1". In FIG. 2(d), advertisement data is associated with, for example, "type" and "stop". Specifically, for example, the "advertisement C1" and the "advertisement C2" are associated with the "rapid" in common irrespective of a stop. For example, the "advertisement G1" and the "advertisement G2" are associated with the "stop S1". For example, the "advertisement G1" and the "advertisement G2" are associated with "stop S2". For example, the "advertisement F1" is associated with "stop S3". The same applies to the types other than the "rapid". In the following explanation, for example, advertisement data is associated with service information, for example, in a format shown in FIG. 2(d). The same explanation applies in other cases.

Figure 3:
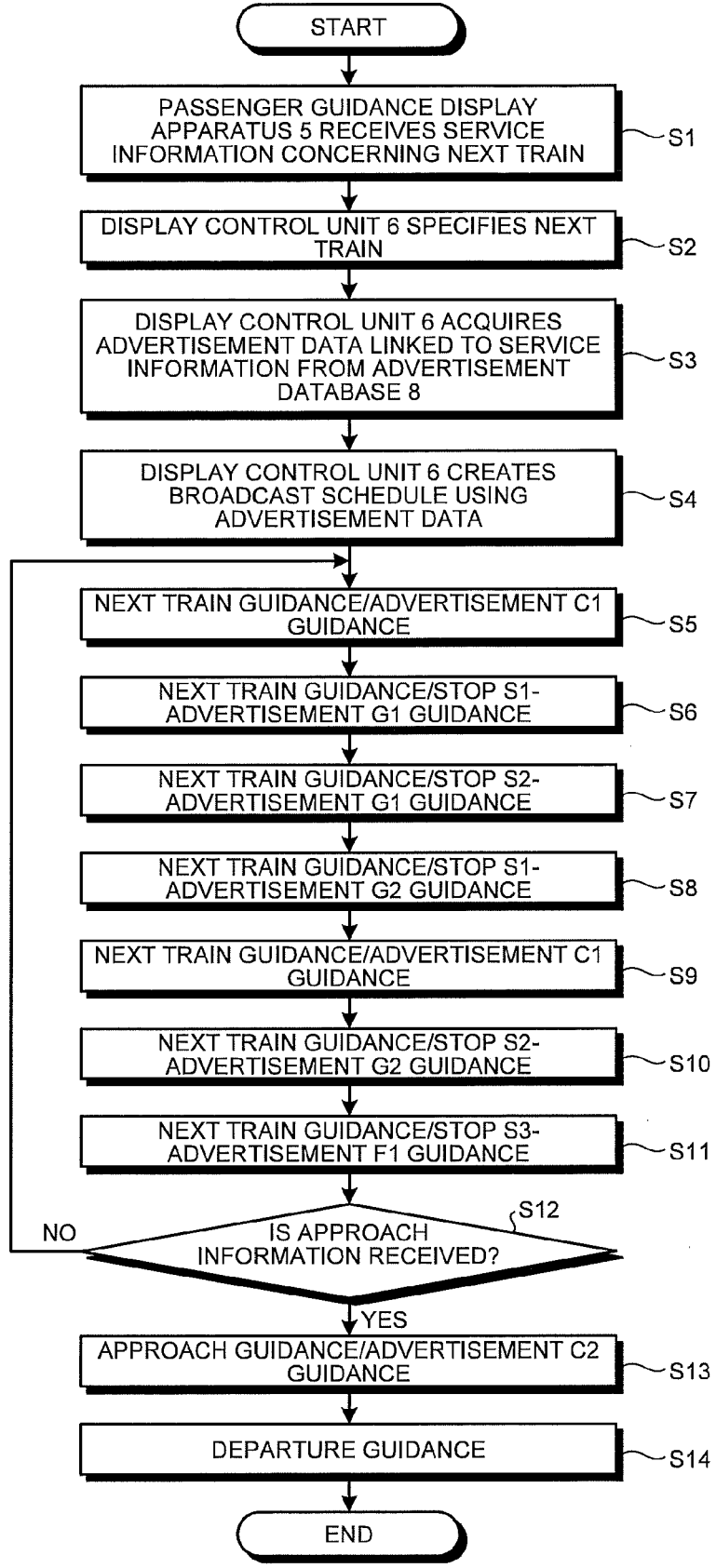
FIG. 3 is a flowchart for explaining a flow of processing in a passenger guidance display apparatus 5.
Figure 4:
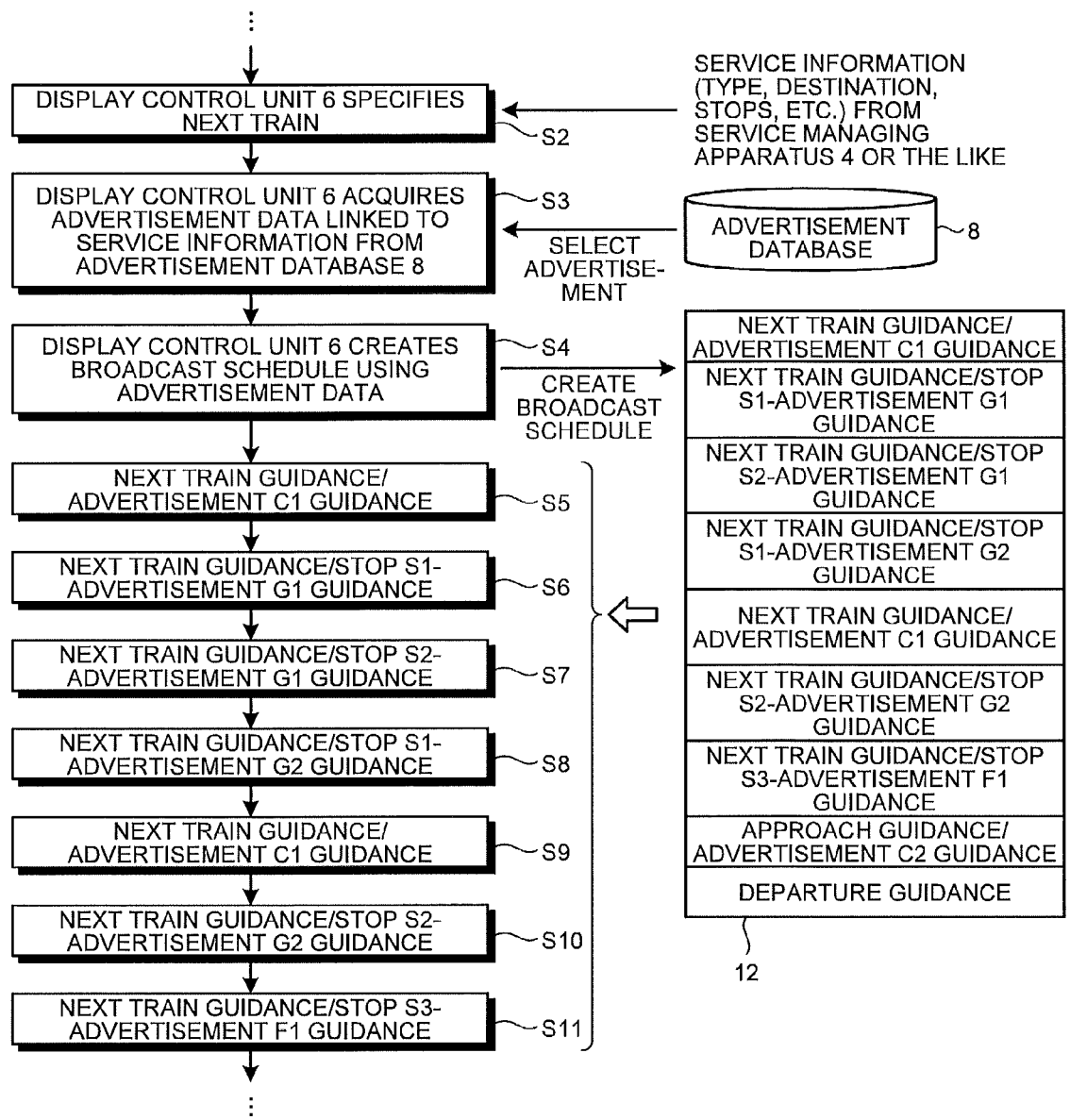
FIG. 4 is a diagram for explaining a part of FIG. 3 in detail.

FIG. 3 is a flowchart for explaining a flow of processing in the passenger guidance display apparatus 5. FIG. 4 is a diagram for explaining a part of FIG. 3 in detail. FIG. 5 is a diagram of an example of contents of display by the passenger guidance display apparatus. It is assumed that the passenger guidance display apparatus 5 is provided, for example, on a platform. In the following explanation, processing performed until a train scheduled to arrive next (the next train) arrives after departure of the preceding train is explained.

First, for example, immediately after departure of the preceding train, the service managing apparatus 4 transmits service information concerning the next train to the passenger guidance display apparatus 5. The service information is information including a type, a destination, and stops of a train. The passenger guidance display apparatus 5 receives the service information concerning the next train transmitted from the service managing apparatus 4 (S1 in FIG. 3). The display control unit 6 specifies the next train based on the service information (S2). The display control unit 6 can discriminate a type and the like of the next train.

Subsequently, the display control unit 6 acquires, based on the service information concerning the next train, advertisement data associated with the service information from the advertisement database 8 (S3). It is assumed that, in the advertisement database 8, advertisement data is associated with service information in, for example, a format shown in FIG. 2(d). If the next train is, for example, a rapid train, the display control unit 6 acquires respective data of the "advertisement C1" and the "advertisement C2" common to stations, the "advertisement G1" and the "advertisement G2" of the "stop S1", the "advertisement G1" and the "advertisement G2" of the "stop S2", and the "advertisement F1" of the "stop S3". The advertisement data associated with the stops can be advertisement contents of stores related to the stops such as stores present in the vicinity of the stops.

Subsequently, the display control unit 6 creates a broadcast schedule 12 using the advertisement data acquired from the advertisement database 8 (S4 in FIG. 4). The broadcast schedule 12 is created by, for example, embedding, in a schedule frame set in advance, the advertisement data selected from the advertisement database 8 and the service information concerning the next train. It is assumed that the display control unit 6 includes schedule frame data in advance.

Subsequently, according to the broadcast schedule 12, the display control unit 6 creates image data using the service information concerning the next train and the "advertisement C1" and causes the display device 7 to display a video using the image data (S5). The passenger guidance display apparatus 5 starts next train guidance. Specifically, the passenger guidance display apparatus 5 performs display guidance for the service information of the next train and the "advertisement C1". This display guidance is referred to as "next train guidance/advertisement C1 guidance" (S5). The display guidance is represented as "next train guidance/advertisement guidance C1 guidance" in the broadcast schedule 12 shown in FIG. 4 as well.

FIG. 5(a) is a diagram of an example of display of the next train guidance including the "advertisement C1". A display screen 20 indicates a screen of the display device 7. The display screen 20 is divided into, for example, an advertisement display region 21 mainly for advertisement display formed in a rectangular shape and a train guidance region 22 mainly for service information display, which is a region other than the advertisement display region 21. In the advertisement display region 21, for example, advertisement display of a moving image is performed. At this stage, for example, the moving image is displayed without sound. In the train guidance region 22, present time information (in the figure, for example, indicated by the minute hand and the hour hand of a clock at the upper left), departure time of the next train ("17:05"), a type of the next train ("rapid"), a destination ("bound for CC"), and stops ("stops are AA, BB, and CC") are displayed. In this way, the advertisement and the service information are displayed on one screen in combination.

Subsequently, according to the broadcast schedule 12, the display control unit 6 creates image data using the service information concerning the next train and the "advertisement G1" associated with the stop S1 and, after the "next train guidance/advertisement C1 guidance" ends, causes the display device 7 to display a video using the image data. This display guidance is referred to as "next train guidance/stop S1-advertisement G1 guidance" (S6). The display guidance is represented as "next train guidance/stop S1-advertisement G1 guidance" in the broadcast schedule 12 shown in FIG. 4 as well.

FIG. 5(b) is a diagram of an example of the display guidance including the "advertisement G1". The guidance shown in FIG. 5(b) is displayed following, for example, sound guidance ("the next train is a rapid train bound for CC. The train stops at AA, BB, and CC" (SND1)). In the advertisement display region 21, the "advertisement G1" related to the CC station, which is the stop S1, is displayed following sound guidance ("TT in front of the AA station, where the train stops, is running a Christmas campaign!" (SND2)). Display contents of the train guidance region 22 are the same as, for example, the display contents shown in FIG. 5(a). In the advertisement display region 21, for example, advertisement display of a moving image is performed.

Subsequently, according to the broadcast schedule 12, the display control unit 6 creates image data using the service information concerning the next train and the "advertisement G1" associated with stop S2 and, after the "next train guidance/stop S1-advertisement G1 guidance" ends, causes the display device 7 to display a video using the image data (S7). This display guidance is referred to as "next train guidance/stop S2-advertisement G1 guidance" (S7). The display guidance is represented as "next train guidance/stop S2-advertisement G1 guidance" in the broadcast schedule 12 shown in FIG. 4 as well.

Thereafter, similarly, according to the broadcast schedule 12, the display control unit 6 causes the display device 7 to display the "next train guidance/stop S1-advertisement G2 guidance" (S8), then causes the display device 7 to display the "next train guidance/advertisement C1 guidance" again (S9), and causes the display device 7 to sequentially display the "next train guidance/stop S2-advertisement G2 guidance" (S10) and the "next train guidance/stop S3-advertisement F1 guidance" (S11). In the example shown in the figure, a plurality of programs including the "next train guidance" and the "advertisement guidance" are sequentially broadcasted. However, the present invention is not limited to this example and various modifications are possible. For example, it is also possible to create a program for displaying only the "next train guidance" without using the "advertisement S1" and the "advertisement S2" and broadcast a program including the "next train guidance" and the "advertisement guidance"

between "next train guidance" programs. When advertisements are allocated to the schedule frame, for example, it is possible to allocate the advertisements in the schedule frame in order determined in advance (e.g., the order of a type, a destination, and stops) and, when there are unallocated advertisements not allocated in the schedule frame, allocate the advertisements irrespective of the order.

Subsequently, the display control unit 6 determines whether approach information for informing approach of the next train is received from the service managing apparatus 4 (S12). When the approach information is not received (No at S12), the display control unit 6 repeats S5 to S12 according to the broadcast schedule 12. In other words, the passenger guidance display apparatus 5 can repeats the series of display guidance until the passenger guidance display apparatus 5 receives the approach information from the service managing apparatus 4.

On the other hand, when the approach information is received from the service managing apparatus 4 (Yes at S12), the display control unit 6 starts guidance concerning the approach information of the next train after a program being broadcasted ends. Specifically, according to the broadcast schedule 12, the display control unit 6 creates image data using the approach information of the next train and the "advertisement C2" and causes the display device 7 to display a video using the image data (S13). This display guidance is referred to as "approach guidance/advertisement C2 guidance" (S13). The display guidance is represented as "approach guidance/advertisement C2 guidance" in the broadcast schedule 12 shown in FIG. 4 as well.

FIG. 5(c) is a diagram of an example of the approach guidance including the "advertisement C2". Guidance shown in FIG. 5(c) is displayed together with, for example, sound guidance. Specifically, "MM electric", which is a name of an advertiser of the "advertisement C2" displayed in the advertisement display region 21 is incorporated in the sound guidance. After sound guidance "RRRR of MM electric announces the next train" (SND3), sound guidance "the next train is a rapid train bound for CC. The train will arrive shortly. Please be careful." (SND4) is performed to arouse the attention of passengers. At this point, in the display screen 20, the train guidance region 22 is enlarged and the advertisement display region 21 is reduced compared with FIGS. 5(a) and (b). Consequently, character display such as "rapid" and "bound for CC" is enlarged and the guidance of the approach information is highlighted. On the other hand, although the size of the advertisement display region 21 is reduced, the size is kept at a degree not hindering visibility of the advertisement guidance to improve a degree of attention of passengers to advertisements.

In the approach guidance, the example of the guidance performed using only the advertisement C2 is explained. However, as in the next train guidance before train approach, it is also possible to select a plurality of different advertisement data and switch display according to, for example, a stop.

Subsequently, after the train arrives at the station, when a signal for informing departure of the train is obtained from the service managing apparatus 4, the display control unit 6 performs departure guidance on the display device 7 (S14). As the departure guidance, for example, the display control unit 6 can display only guidance for informing the departure of the train or can display the guidance in combination with advertisement guidance. After the departure of the train, the display control unit 6 starts guidance of the next train based on service information of the next train received from the service managing apparatus 4.

According to this embodiment, advertisement contents associated with service information such as types, destinations, and stops of trains are prepared. The passenger guidance display apparatus 5 provides advertisement guidance related to service information together with train guidance (the next train guidance, the approach guidance, the departure guidance, etc.) or before or after the train guidance. Consequently, it is possible to improve a degree of attention of passengers to advertisements and improve an advertisement effect. In particular, as shown in FIG. 5, an advertisement and service information are combined and displayed on one screen. Consequently, it is possible to improve a degree of attention of passengers to advertisements and improve an advertisement effect.

On the other hand, in the past, contents such as advertisements are displayed irrespective of service information. Therefore, a degree of attention of passengers to advertisements is low compared with this embodiment.

According to this embodiment, for example, an advertisement of a store related to a stop of a train is broadcasted and displayed together with train guidance. Consequently, it is possible to improve an advertisement effect for passengers who get off the train at the stop. For example, an induction effect is also sometimes attained in that passengers who view the advertisement visit the store.

The advertisement data stored in the advertisement database 8 is associated with the service information. However, the advertisement data can be further associated with the passenger guidance display apparatus 5 as well. For example, a plurality of passenger guidance display apparatuses 5 can be set on a platform at a predetermined interval to display different advertisements on the passenger guidance display apparatuses 5 according to setting positions. In this case, the advertisement data stored in the advertisement database 8 is associated with the passenger guidance display apparatuses 5 together with the service information.

In FIG. 1, the display control unit 6 and the display device 7 are shown as being provided in one apparatus as components in the passenger guidance display apparatus 5. However, the display control unit 6 and the display device 7 can be separated from each other as hardware and configured as separate devices. In the examples shown in FIGS. 3 to 5, the sound guidance is performed together with the video guidance. In a configuration in this case, a sound control unit (not shown in the figures) and a speaker (not shown in the figures) are further provided in the passenger guidance display apparatus 5 shown in FIG. 1. The sound control unit that receives service information and advertisement data from the display control unit 6 generates a sound signal and outputs the sound signal to the speaker at predetermined timing, whereby the sound guidance is performed.

Figure 6:
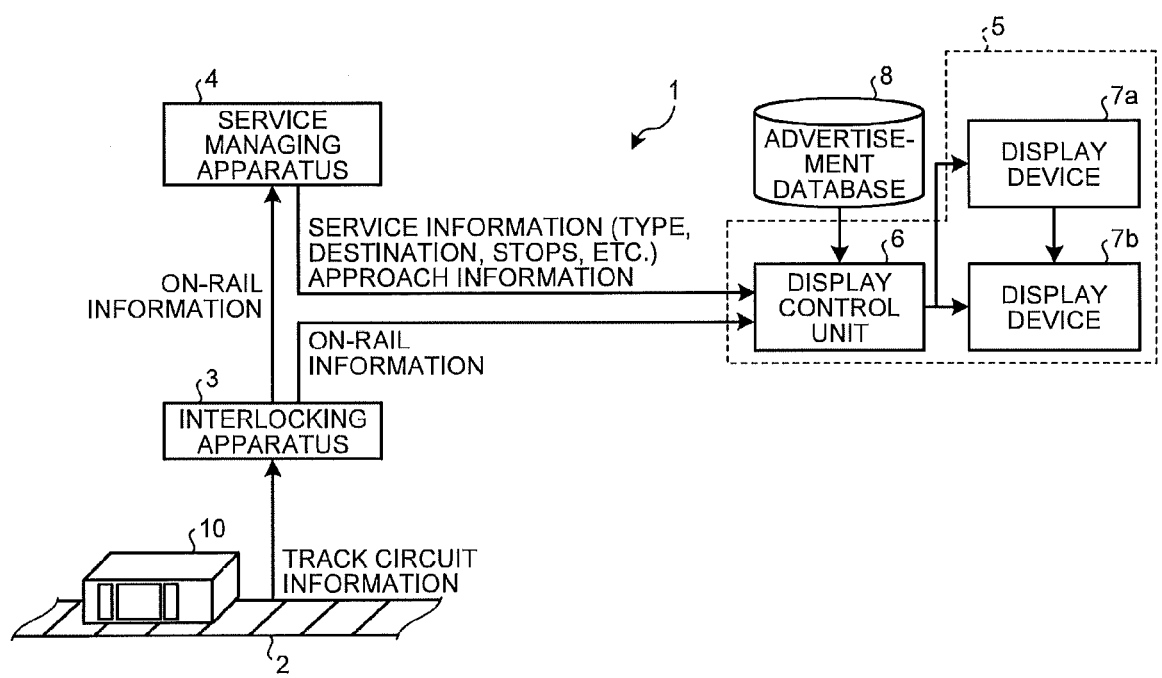
FIG. 6 is a diagram of a configuration example in which the passenger guidance display apparatus 5 includes a plurality of display devices.

In FIG. 1, one display device 7 is connected to the display control unit 6. However, it is also possible to adopt a configuration in which a plurality of display devices are connected. FIG. 6 is a diagram of a configuration example in which the passenger guidance display apparatus 5 includes a plurality of display devices. For example, two display devices 7a and 7b are connected to the display control unit 6. In FIG. 5, the display screen 20 of the one display device 7 is divided into two regions and the next train guidance and the advertisement guidance are performed in the different display regions in the display screen 20. In FIG. 6, the display control unit 6 separates a video output into a video output concerning the next train guidance (service information guidance) and a video output concerning the advertisement guidance. For example, the next train guidance is displayed on the display device 7a and the advertisement guidance is displayed on the display device 7b. In other words, the next train guidance and the advertisement guidance are displayed on the separate devices. The display devices 7a and 7b are desirably disposed in parallel, for example, above a door of a train.

In this embodiment, on-rail information of a train is obtained by using the track circuits 2 and the interlocking apparatus 3. However, it is also possible to obtain on-rail information without using the track circuits 2 and the interlocking apparatus 3. For example, a radio communication apparatus and a train information managing apparatus are mounted on the train 10, a radio communication function is imparted to the passenger guidance display apparatus 5, and kilometrage information stored by the train information managing apparatus is directly transmitted from the train to the passenger guidance display apparatus 5 using the radio communication apparatus. The train information managing apparatus is an apparatus mounted on cars and configured to perform collection management for train information. The train information managing apparatus manages train information including kilometrage from a starting station and service information of the train. The passenger guidance display apparatus 5 receives the kilometrage information of the train using the radio communication function. The passenger guidance display apparatus 5 can grasp the location of the train based on the kilometrage information and obtain on-rail information. At this point, it is possible to transmit service information (a type, a destination, stops, etc.) stored by the train information managing apparatus from the train as well.

Second Embodiment

In the first embodiment, the passenger guidance display apparatus 5 selects, according to the service information of the next train, the advertisement contents associated with the service information, creates programs such as the "next train guidance/advertisement C1 guidance", and sequentially displays the programs. Therefore, the number of times of guidance of an advertisement is clearly defined as the number of times of broadcasting of the programs.

Therefore, in a second embodiment, in addition to the components in the first embodiment, a function of counting the number of times guidance of advertisements performed and storing the number of times in a memory (not shown in the figures) is imparted to the display control unit 6. After the broadcast of the programs, the display control unit 6 increments the number of times of broadcasting by one concerning an advertisement used in the programs and records the number of times. The display control unit 6 can output the recorded number of times of broadcasting for each of the advertisements. For example, broadcast times of the programs are fixed.

The display control unit 6 stores the number of times of guidance of the advertisements, whereby it is possible to sell an advertisement slot, for example, in a unit of number of times. On the other hand, the advertisement guidance in a station premise in the past is provided irrespective of service information of trains. A unit of an advertisement slot of the advertisement guidance is, for example, a day unit.

When abnormality that hinders train service occurs on a railway, the passenger guidance display apparatus 5 sometimes stops advertisement broadcast and displays abnormal time information. In such a case, the number of displayed and broadcasted advertisement contents is not counted. Therefore, it is possible to return expenses to an advertiser concerning the uncounted number of displayed and broadcasted advertisement contents.

As explained above, according to this embodiment, the number of times of guidance of advertisements provided in one day is clarified by associating the advertisement guidance and the service information. Therefore, it is possible to perform not only the advertisement slot sales in the period unit in the past but also advertisement slot sales in the unit of number of times.

Third Embodiment

In the first and second embodiments, when the approach information of the train is detected, for example, immediately after advertisement guidance requiring a long broadcast time is started, waiting for the advertisement guidance being currently reproduced to end, the approach guidance is performed. It is likely that the start of the approach guidance is delayed. Therefore, in a third embodiment, a function of adjusting a broadcast schedule to make it possible to quickly shift to the approach guidance without delay after the approach information is detected is explained. A system configuration of this embodiment is the same as the configuration of the passenger guidance display system according to the first embodiment shown in FIG. 1.

FIG. 7 is a diagram for explaining an adjusting method for a broadcast schedule in this embodiment. In FIG. 7(a), a platform 25, the train 10, and the passenger guidance display apparatus 5 are shown. The train 10 is traveling toward the platform 25. A track circuit H is a track circuit including a platform section on a railway. In other words, the track circuit H is laid along the platform 25 in a station. A track circuit B is one track circuit before the track circuit H in a traveling direction of the train 10. A track circuit A is one track circuit before the track circuit B in the traveling direction. One end on the near side in the traveling direction of the track circuit A is represented by P, a boundary between the track circuit A and the track circuit B is represented by Q, and a boundary between the track circuit B and the track circuit H is represented by R.

The service managing apparatus 4 tracks the location of the train 10 based on on-rail information sequentially transmitted from the interlocking apparatus 3. When determining that the train 10 enters the track circuit B, i.e., when the first car of the train 10 reaches one end Q of the track circuit B, the service managing apparatus 4 generates approach information and transmits the approach information to the passenger guidance display apparatus 5. Therefore, the display control unit 6 detects, at timing when the train 10 enters the track circuit B, the approach information transmitted from the service managing apparatus 4. After detecting the approach information, the display control unit 6 starts the approach guidance on the display device 7 waiting for the advertisement guidance being broadcasted to end. The advertisement guidance being broadcasted is switched to the approach guidance after the advertisement guidance ends. This is for preventing an advertisement being broadcasted together with the next train guidance from being terminated halfway in the broadcast. In FIG. 7(a), it is schematically shown that the approach guidance is started after the train 10 enters the track circuit B. The display control unit 6 performs reestablishment of a broadcast schedule as explained below to make it possible to quickly shift to the approach guidance after the approach information is detected.

First, the service managing apparatus 4 calculates in advance an average required time T necessary for the train 10 to pass the track circuit A (FIG. 7(a)). Specifically, the service managing apparatus 4 calculates the average required time T by dividing length (track length) La of the track circuit A given in advance by average speed V of the train 10 in the track circuit A. Such a function of the service managing apparatus 4 is referred to as average required time calculating function. The service managing apparatus 4 can calculate the average speed V in the track circuit A of the train 10 from, for example, a service schedule. In this case, the average speed V is different according to a type of a train or a difference in a traveling period of time. The service managing apparatus 4 stores information concerning the length La of the track circuit A in advance.

Subsequently, the service managing apparatus 4 tracks the location of the train 10 based on on-rail information sequentially transmitted from the interlocking apparatus 3. The service managing apparatus 4 detects time when determining that the train 10 enters the track circuit A, i.e., time when the first car reaches one end P of the track circuit A. At the timing of the detection, the service managing apparatus 4 generates a signal including information concerning the average required time T calculated in advance (hereinafter referred to as "broadcast schedule adjustment signal") and transmits the broadcast schedule adjustment signal to the passenger guidance display apparatus 5. Such a function of the service managing apparatus 4 is referred to as broadcast schedule adjustment signal generating function.

Subsequently, upon receiving the broadcast schedule adjustment signal, the display control unit 6 calculates time Tm obtained by subtracting the remaining broadcast time of a program being reproduced at the reception time of the signal (e.g., the "next train guidance/stop S1-advertisement G1 guidance" in the first embodiment) from the average required time T obtained from the broadcast schedule adjustment signal (hereinafter referred to as "broadcast adjustment time") and establishes a broadcast schedule 12a such that a broadcast time fits within the broadcast adjustment time Tm (FIGS. 7(*a*) and (*b*)). In other words, the display control unit 6 reestablishes the broadcast schedule 12a from the broadcast schedule 12. As explained above, the display control unit 6 has a broadcast adjustment calculating function and a broadcast schedule reestablishing function. Specifically, the display control unit 6 performs control as explained below.

First, as shown in FIG. 2(*e*), in the advertisement database 12, it is assumed that the advertisement data associated with the service information includes, for example, three advertisement data having broadcast times different from one another, for example, long, medium, and short. For example, "advertisement C1_L", "advertisement C1_M", and "advertisement C1_S" are data concerning the same advertisement C1 but respectively represent data having long, medium, and short broadcast times in order when guidance videos are created from the data. For example, a broadcast time from the start until the end of advertisement guidance created by the display control unit 6 selecting the "advertisement C1_L" is longer than a broadcast time from the start until the end of advertisement guidance created by selecting the "advertisement C1_M". As explained above, in this embodiment, in the advertisement database 8, a plurality of advertisement data representing the same advertisement contents but having broadcast times different from one another are associated with the service information. The number of data having broadcast times different from one another prepared for the advertisement data is not limited to three and can be plural in general.

Subsequently, the display control unit 6 selects one or a plurality of advertisement data from the advertisement database 8 and creates the broadcast schedule 12a such that a broadcast time fits within the broadcast adjustment time Tm. At this point, the display control unit 6 performs schedule adjustment such that a sum of broadcast times of programs included in the broadcast schedule 12a is within the broadcast adjustment time Tm and as close as possible to the broadcast adjustment time Tm. Specifically, the display control unit 6 adjusts the number of selected advertisement data according to the broadcast adjustment time Tm and performs adjustment of the total broadcast time making use of a degree of freedom of selecting one data out of broadcast data that are the same advertisement but have different broadcast times, i.e., long, medium, and short broadcast times. In other words, the display control unit 6 can individually adjust broadcast times of guidance videos by selecting one data out of a plurality of data having broadcast times different from one another. The average required time T is determined in advance according to track circuit length and average speed. Therefore, it is possible to determine in advance patterns of combinations of the long, medium, and short broadcast times according to the average required time T. If broadcast times respectively corresponding to L, M, and N are, for example, 60 seconds, 30 seconds, and 15 seconds and the average required time T is, for example, 180 seconds, there is a degree of freedom, for example, three kinds of advertisement guidance for "60 seconds" can be performed, one kind of advertisement guidance for "60 seconds" and four kinds of advertisement guidance for "30 seconds" can be performed, and six kinds of advertisement guidance for "30 seconds" can be performed. It is also possible to select a pattern of one of these kinds of advertisement guidance in advance and allocate advertisement data according to the pattern.

This is specifically explained using an example shown in FIG. 7(*b*). It is assumed that, at a point when the train 10 enters the track circuit A, an "advertisement currently being broadcasted" is, for example, the "next train guidance/stop S1-advertisement G1 guidance" explained in the first embodiment. In this case, according to the broadcast schedule 12, after the end of the broadcast of the "next train guidance/stop S1-advertisement G1 guidance", "next train guidance/stop S2-advertisement G1 guidance", "next train guidance/stop S1-advertisement G2 guidance", "next train guidance/advertisement C1 guidance", "next train guidance/stop S2-advertisement G2 guidance", and "next train guidance/stop S3-advertisement F1 guidance" are scheduled to be sequentially broadcasted.

However, upon receiving a broadcast schedule adjustment signal, the display control unit 6 creates the broadcast schedule 12a replacing the broadcast schedule 12. Specifically, as shown in FIG. 7(*b*), the display control unit 6 creates the broadcast schedule 12a for broadcasting "next train guidance/stop S2-advertisement G1_L guidance" including "advertisement G1_L" having a long broadcast time, "next train guidance/stop S1-advertisement G2_M guidance" including "advertisement G2_M" having a medium broadcast time, "next train guidance/advertisement C1_S guidance" including "advertisement C1_S" having a short broadcast time, "next train guidance/stop S2-advertisement G2_L guidance" including "advertisement G2_L" having a long broadcast time, and "next train guidance/stop S3-advertisement F1_S guidance" including "advertisement F1_S" having a short broadcast time in this order. Such a combination of the programs is a combination in which a sum of the broadcast times of the programs fits within the broadcast adjustment time Tm and the sum of the broadcast times is not shorter than sums of broadcast times by other combinations of programs.

Various configurations are possible as the configuration of the broadcast schedule 12a. Selection of advertisement data is not limited to the example explained above. Various kinds of selection are possible. For example, the broadcast schedule 12a can be established in association with the broadcast schedule 12 or can be established irrespective of the broadcast schedule 12. For example, in selecting advertisement data from the advertisement database 8 the display control unit 6 can select advertisement data in a leveling manner such that a specific advertisement is not concentratedly selected.

For example, when a train slows down, even after reproduction of advertisement contents is completed according to the broadcast schedule 12a, the train sometimes does not reach the track circuit B where the approach guidance is started. In such a case, the display control unit 6 selects advertisement data having a short reproduction time from the advertisement database 8 creates a guidance video having a short reproduction time using the selected advertisement data, and performs reproduction of the guidance video. Consequently, it is possible to, without forming an interval of broadcasts, quickly shift to the approach guidance when the train enters the track circuit A.

When an advertisement is broadcasted, it is necessary to prevent the advertisement from being suspended halfway in a broadcast of the advertisement except when the suspension is inevitable because of characteristics of the advertisement. Therefore, for example, when the approach guidance for a train has to be performed while an advertisement having a long broadcast time is broadcasted, the approach guidance cannot be performed until the advertisement ends. As a result, it is likely that broadcast timing for the approach guidance is delayed.

According to this embodiment, when the train enters the track circuit A, the broadcast adjustment time Tm is calculated that is time obtained by subtracting the remaining broadcast time of video guidance being broadcasted at that point from the average required time T necessary for the train 10 to pass the track circuit A. The broadcast schedule 12a is established such that a sum of broadcast times of programs before generation of approach information fits within the broadcast adjustment time Tm and becomes the largest. Therefore, it is possible to quickly start the approach guidance after the generation of the approach information.

INDUSTRIAL APPLICABILITY

As explained above, the present invention is useful as a passenger guidance display system, a passenger guidance display apparatus, and a passenger guidance display method for displaying passenger guidance such as service information of trains and advertisements.

REFERENCE SIGNS LIST 1 passenger guidance display system
2 track circuit
3 interlocking apparatus
4 service managing apparatus
5 passenger guidance display apparatus
6 display control unit
7, 7a, 7b display device
8 advertisement database
10 train
12 broadcast schedule
20 display screen
21 advertisement display region
22 train guidance region
25 platform

The invention claimed is:
1. A passenger guidance display system comprising:
a group of track circuits laid along a track of the train, including a first track circuit including a platform section of a station, a second track circuit being one track circuit before the first track circuit in a traveling direction of the train, and a third track circuit being one track circuit before the second track circuit in the traveling direction of the train, each of track circuits outputting track circuit information indicating a presence or an absence of on-rail of the train;
an interlocking apparatus configured to collect the track circuit information output from the group of track circuits and output an on-rail position of the train detected based on the track circuit information as on-rail information;
a service managing apparatus configured to specify and manage service information of the train based on the on-rail information output from the interlocking apparatus and a service schedule of the train, and generate, upon determining that the train enters the second track circuit based on the on-rail information, approach information for informing an approach of the train to the station; and
a passenger guidance display apparatus provided in the station premise and configured to perform display of passenger guidance using the service information or the approach information of the train scheduled to arrive next transmitted from the service managing apparatus, wherein
the passenger guidance display apparatus includes:
an advertisement database including advertisement data associated with service information of trains;
a display control unit configured to select, from the advertisement database, advertisement data associated with the service information of the train scheduled to arrive next and combine the selected advertisement data and the service information to create a singularity of or a plurality of first guidance videos and to perform a passenger guidance using the first guidance videos before receiving the approach information, and combine, after the first guidance videos guided during a reception of the approach information are finished, the selected advertisement data and the service information to create second guidance videos and to perform the passenger guidance using the second guidance videos after receiving the approach information; and
a display device configured to display the first guidance videos or the second guidance videos according to control by the display control unit, wherein
the service managing apparatus includes information concerning an average required time necessary for the train to pass the third track circuit and transmits, upon determining based on the on-rail information that the train enters the third track circuit, the information concerning the average required time to the passenger guidance display apparatus, and
the display control unit calculates, upon a reception of the information concerning the average required time from the service managing apparatus, a broadcast adjustment time, which is a time obtained by subtracting from the average required time a remaining broadcast time of the first guidance videos broadcasted at the reception of the information concerning the average required time, and creates the first guidance videos such that a total broadcast time of the first guid- ance videos broadcasted on the display device after end of a broadcast of the first guidance videos and before start of a broadcast of the second guidance videos fits within the broadcast adjustment time.

2. The passenger guidance display system according to claim 1, wherein
in the advertisement database, the advertisement data associated with the service information includes a plurality of data representing same advertisement contents but having broadcast times different from one another, and
in creating each of the first guidance videos broadcasted on the display device after the end of the broadcast of the first guidance video broadcasted at the reception time of the information concerning the average required time and before the start of the broadcast of the second guidance videos, the display control unit fits the total broadcast time in the broadcast adjustment time by selecting one data out of the advertisement data associated with the service information in the advertisement database, which are a plurality of data having broadcast times different from one another, and individually adjusting a broadcast time of each of the first guidance videos.

3. The passenger guidance display system according to claim 2, wherein the display control unit selects one data out of the advertisement data associated with the service information in the advertisement database, which are the data having the broadcast times different from one another, such that the total broadcast time is a largest total broadcast time that fits within the broadcast adjustment time.

4. The passenger guidance display system according to claim 1, wherein the service information includes a type, a destination, and stops of the train.

5. The passenger guidance display system according to claim 4, wherein the advertisement database includes advertisement data associated with any one of the type, the destination, and the stops or an arbitrary combination of the type, the destination, and the stops.

6. The passenger guidance display system according to claim 1, wherein the display control unit divides, when the display device displays the first guidance videos or the second guidance videos, a display screen of the display device into an advertisement display region for advertisement display and a train guidance region for service information display and causes the display device to display the guidance video.

7. The passenger guidance display system according to claim 1, wherein the passenger guidance display apparatus performs sound guidance together with the display of the first guidance videos or the second guidance videos.

8. The passenger guidance display system according to claim 7, wherein the passenger guidance display apparatus incorporates a name of an advertiser of the selected advertisement data in the sound guidance and broadcasts the sound guidance.

9. The passenger guidance display system according to claim 1, wherein the display control unit records, for each advertisement, number of times of broadcasting of the advertisement guidance included in the first guidance videos or the second guidance videos and broadcasted on the display device.

10. A passenger guidance display apparatus included in a passenger guidance display system comprising, a group of track circuits laid along a track of the train, including a first track circuit including a platform section of a station, a second track circuit being one track circuit before the first track circuit in a traveling direction of the train, and a third track circuit being one track circuit before the second track circuit in the traveling direction of the train, each of track circuits outputting track circuit information indicating a presence or an absence of on-rail of the train; an interlocking apparatus configured to collect the track circuit information output from the group of track circuits and output an on-rail position of the train detected based on the track circuit information as on-rail information; a service managing apparatus configured to specify and manage service information of the train based on the on-rail information output from the interlocking apparatus and the service schedule of the train, and generate, upon determining that the train enters the second track circuit based on the on-rail information, approach information for informing an approach of the train to the station,
the passenger guidance display apparatus provided in the station premise and configured to perform display of passenger guidance using the service information or the approach information of the train scheduled to arrive next transmitted from the service managing apparatus, wherein
the passenger guidance display apparatus includes:
an advertisement database including advertisement data associated with service information of trains;
a display control unit configured to select, from the advertisement database, advertisement data associated with the service information of the train scheduled to arrive next and combine the selected advertisement data and the service information to create a singularity of or a plurality of first guidance videos and to perform a passenger guidance using the first guidance videos before receiving the approach information, and combine, after the first guidance videos guided during a reception of the approach information are finished, the selected advertisement data and the service information to create second guidance videos and to perform the passenger guidance using the second guidance videos after receiving the approach information; and
a display device configured to display the first guidance videos or the second guidance videos according to control by the display control unit, wherein
the service managing apparatus includes information concerning an average required time necessary for the train to pass the third track circuit and transmits, upon determining based on the on-rail information that the train enters the third track circuit, the information concerning the average required time to the passenger guidance display apparatus, and
the display control unit calculates, upon a reception of the information concerning the average required time from the service managing apparatus, a broadcast adjustment time, which is a time obtained by subtracting from the average required time a remaining broadcast time of the first guidance videos broadcasted at the reception of the information concerning the average required time, and creates the first guidance videos such that a total broadcast time of the first guidance videos broadcasted on the display device after end of a broadcast of the first guidance videos and before start of a broadcast of the second guidance videos fits within the broadcast adjustment time.

11. The passenger guidance display apparatus according to claim 10, wherein
in the advertisement database, the advertisement data associated with the service information includes a plurality of data representing same advertisement contents but having broadcast times different from one another, and
in creating each of the first guidance videos broadcasted on the display device after the end of the broadcast of the first guidance videos broadcasted at the reception of the information concerning the average required time and before the start of the broadcast of the second guidance videos, the display control unit fits the total broadcast time in the broadcast adjustment time by selecting one data out of the advertisement data associated with the service information in the advertisement database, which are a plurality of data having broadcast times different from one another, and individually adjusting a broadcast time of each of the first guidance videos.

12. The passenger guidance display apparatus according to claim 11, wherein the display control unit selects one data out of the advertisement data associated with the service information in the advertisement database, which are the data having the broadcast times different from one another, such that the total broadcast time is a largest total broadcast time that fits within the broadcast adjustment time.

13. A passenger guidance display method employed in a passenger guidance display system comprising, a group of track circuits laid along a track of the train, including a first track circuit including a platform section of a station, a second track circuit being one track circuit before the first track circuit in a traveling direction of the train, and a third track circuit being one track circuit before the second track circuit in the traveling direction of the train, each of track circuits outputting track circuit information indicating a presence or an absence of on-rail of the train; an interlocking apparatus configured to collect the track circuit information output from the group of track circuits and output an on-rail position of the train detected based on the track circuit information as on-rail information; a service managing apparatus configured to specify and manage service information of the train based on the on-rail information output from the interlocking apparatus and a service schedule of the train, and generate, upon determining that the train enters the second track circuit based on the on-rail information, approach information for informing an approach of the train to the station; and a passenger guidance display apparatus provided in the station premise and configured to perform display of passenger guidance using the service information or the approach information of the train scheduled to arrive next transmitted from the service managing apparatus, wherein the passenger guidance display apparatus includes, an advertisement database including advertisement data associated with service information of trains; a display control unit configured to select, from the advertisement database, advertisement data associated with the service information of the train scheduled to arrive next and combine the selected advertisement data and the service information to create a singularity of or a plurality of first guidance videos and to perform a passenger guidance using the first guidance videos before receiving the approach information, and combine, after the first guidance videos guided during a reception of the approach information are finished, the selected advertisement data and the service information to create second guidance videos and to perform the passenger guidance using the second guidance videos after receiving the approach information; and a display device configured to display the first guidance videos or the second guidance videos according to control by the display control unit, wherein the passenger guidance display method comprises:

a step of calculating, at the service managing apparatus, an average required time necessary for the train to pass the third track circuit by dividing a track length of the third track circuit by an average speed of the train in the third track circuit;

a step of transmitting, at the service managing apparatus, upon determining based on the on-rail information that the train enters the third track circuit, information concerning the average required time to the passenger guidance display apparatus;

a step of calculating, at the display control unit, upon a reception of the information concerning the average required time from the service managing apparatus, a broadcast adjustment time, which is a time obtained by subtracting from the average required time a remaining broadcast time of the first guidance videos broadcasted at the reception of the information concerning the average required time; and a step of creating, at the display control unit, the first guidance videos such that a total broadcast time of the first guidance videos broadcasted on the display device after end of a broadcast of the first guidance videos and before start of a broadcast of the second guidance videos fits within the broadcast adjustment time.

* * * * *